United States Patent
Taig

[11] Patent Number: 5,378,120
[45] Date of Patent: Jan. 3, 1995

[54] ULTRASONIC HYDRAULIC BOOSTER PUMP AND BRAKING SYSTEM

[75] Inventor: Alistair G. Taig, Edwardsburg, Mich.

[73] Assignee: AlliedSignal Inc., Morristown, N.J.

[21] Appl. No.: 199,870

[22] Filed: Feb. 22, 1994

[51] Int. Cl.⁶ .............................................. F04B 17/00
[52] U.S. Cl. .................................. 417/322; 417/413.2; 60/400
[58] Field of Search ............... 417/322, 413 A, 413 B; 60/400, 428

[56] References Cited

U.S. PATENT DOCUMENTS

| | | |
|---|---|---|
| 2,928,409 | 3/1960 | Johnson et al. |
| 3,107,630 | 10/1963 | Johnson et al. |
| 3,361,067 | 1/1968 | Webb |
| 3,657,930 | 4/1972 | Jacobson |
| 4,629,039 | 12/1986 | Imoto et al. |
| 4,690,465 | 9/1987 | Takeda et al. |
| 4,735,185 | 4/1988 | Imoto et al. ................ 417/322 |
| 4,738,493 | 4/1988 | Inagaki et al. |
| 4,753,579 | 6/1988 | Murphy |
| 4,773,218 | 9/1988 | Wakita et al. |
| 4,944,659 | 7/1990 | Labbe et al. |

FOREIGN PATENT DOCUMENTS

| | | | |
|---|---|---|---|
| 2554516 | 5/1985 | France | 417/413 A |
| 0200080 | 11/1984 | Japan | 417/413 A |
| 60-143173 | 7/1985 | Japan |  |
| 0177476 | 7/1989 | Japan | 417/413 A |
| 0134273 | 6/1991 | Japan | 417/413 A |

Primary Examiner—Richard A. Bertsch
Assistant Examiner—M. Kocharov
Attorney, Agent, or Firm—Larry J. Palguta; Leo H. McCormick, Jr.

[57] ABSTRACT

The ultrasonic hydraulic booster pump (10, 150) comprises a backing plate housing (11) defining a cavity (14) closed at one end (13) by an end cap (18), the end cap (18) having an inlet port (20) and the backing plate housing (11) having an outlet port (16). A diaphragm (35). (30) having a plurality of openings (33) is mounted between the end cap (18) and a spacer member (35) located within the cavity. A plurality of annular shaped piezoelectric rings or discs (60) are located within a ring housing (40) disposed within the spacer member A plug member (50) with a through opening (52) extends through a central through opening (44) in the ring housing (40) and includes a valve seat (58) disposed closely adjacent a solid central portion (34) of the diaphragm (30), and the end cap (18) includes a valve seat (22) disposed closely adjacent the opposite side of the diaphragm (30). An alternating voltage applied to the piezoelectric rings (60) causes excitation thereof and resonance of the diaphragm (30) so that hydraulic fluid is pumped from the inlet port (20) and out the outlet port (16). The ultrasonic hydraulic booster pump (150) provides increased or boost pressure in a hydraulic braking system (100).

24 Claims, 3 Drawing Sheets

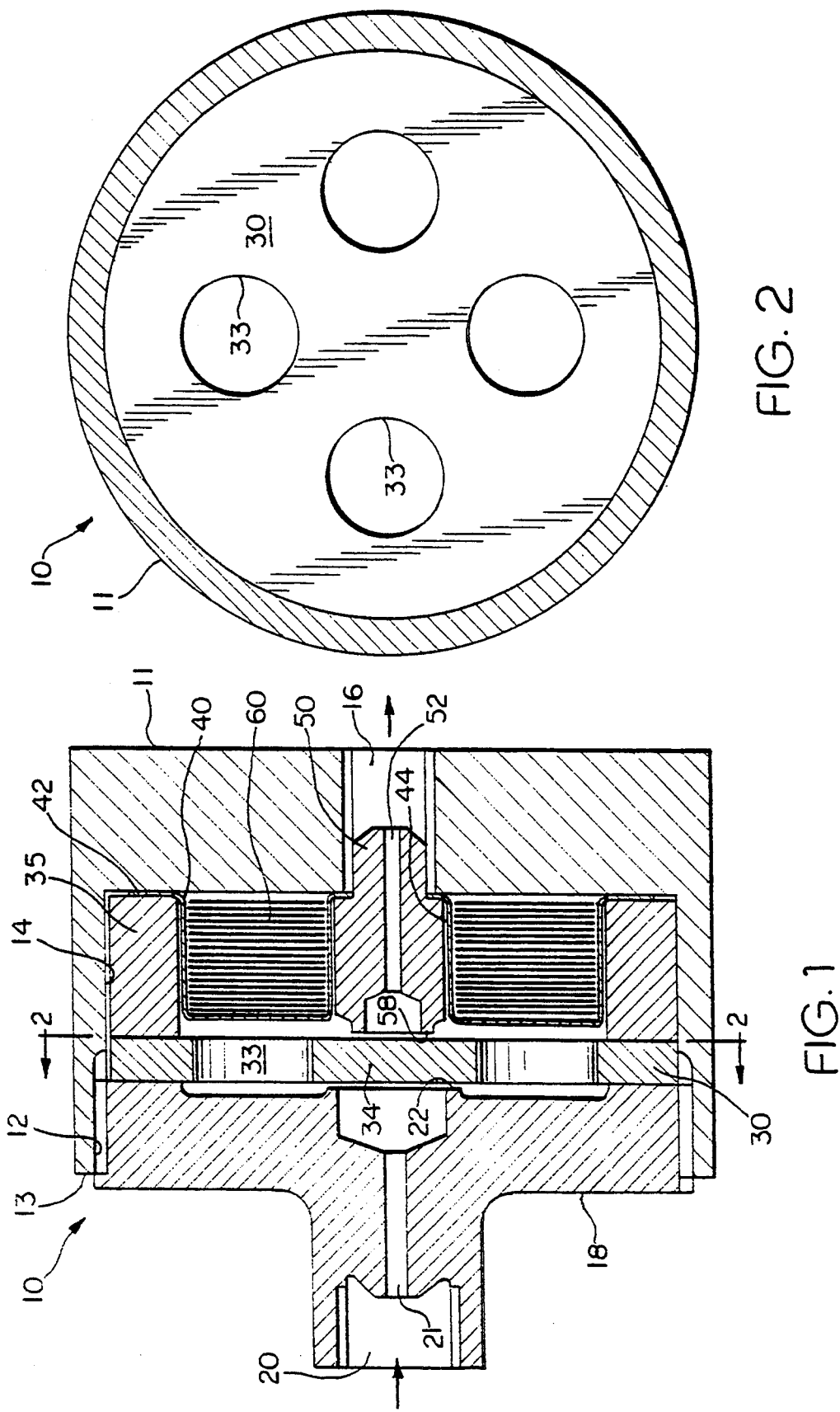

ULTRASONIC HYDRAULIC BOOSTER PUMP AND BRAKING SYSTEM

The present invention relates generally to an ultrasonic pump and in particular to an ultrasonic hydraulic booster pump that may be utilized in vehicle braking systems.

Some vehicle braking systems have used a hydraulic booster to provide increased hydraulic pressure that is transmitted to the vehicle brakes. Typically, a source of fluid pressure, such as a pump and an associated accumulator, are provided in the vehicle braking system in order to transmit a boost pressure to the hydraulic booster which generally can comprise a master cylinder with a boost chamber. Such hydraulically boosted systems typically require a large number of parts including a pump, an accumulator to provide immediate high pressure when the pump is activated, all of which can lead to a somewhat complex and expensive system. It is highly desirable to provide a simplified hydraulically boosted braking system which requires as few components and pares as necessary, with the components and parts easily and inexpensively manufactured and being highly reliable. It is also highly desirable that the components and/or parts of a hydraulically boosted system be as small as possible, the reduction in size not only saving packaging space under the hood of the vehicle but contributing toward weight reduction for the vehicle. It is also highly desirable that the hydraulically boosted system be compatible with an anti-lock braking system such that the boost pressure producing mechanism effects the function of a modulator and pump typically present in an anti-lock brake system.

The present invention provides solutions to the above by providing an ultrasonic pump, comprising a backing plate housing defining therein a cavity communicating with an end opening, an end cap located in the end opening, the end cap having a first port and the plate housing having a second port, a diaphragm located within the cavity between the end cap and backing plate, the diaphragm having therein a plurality of openings, a plurality of piezoelectric rings disposed in a ring housing and located in the cavity between the diaphragm and plate housing, and a second port plug member located within the rings and ring housing and between the plate housing and diaphragm, the plug member having a through opening communicating with the second port, such that excitation of said piezoelectric rings effects resonance of said diaphragm to cause hydraulic fluid located within the cavity to be transmitted between the ports.

One way of carrying out the invention is described in detail below with reference to the drawings which illustrate an embodiment in which:

FIG. 1 is a section view of the ultrasonic hydraulic booster pump of the present invention;

FIG. 2 is a section view taken along view line 2—2 of FIG. 1;

Figure 3:
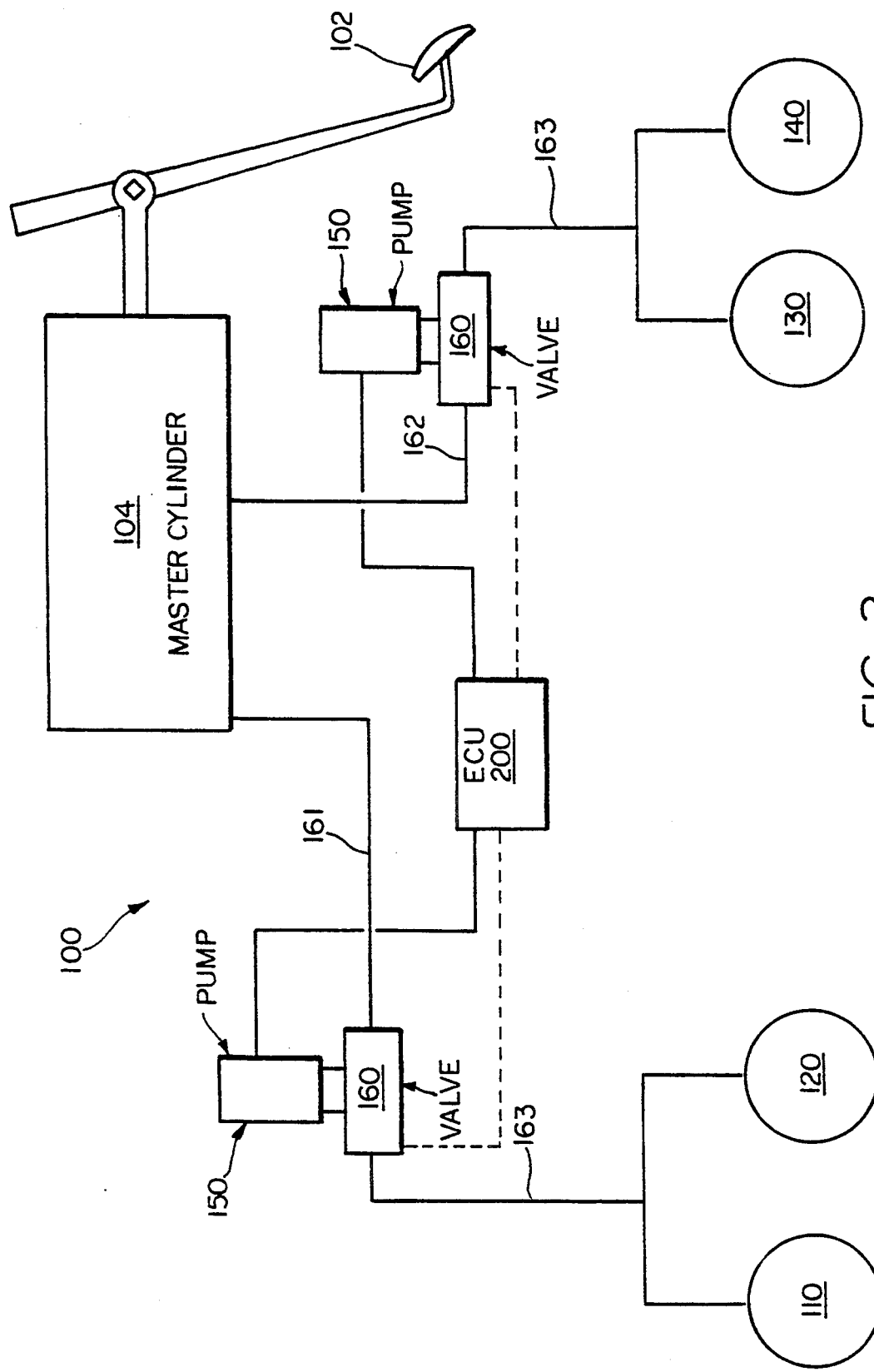
FIG. 3 is a schematic illustration of a vehicle braking system utilizing the ultrasonic pump and booster valve of the present invention.

Referring to FIG. 1, the ultrasonic hydraulic booster pump is designated generally by reference numeral 10. Pump 10 includes backing plate housing 11 which is generally annular shaped and defines end opening 12 at end 13. End opening 12 communicates with cavity 14 that communicates with outlet port 16. Annular end cap 18 is engaged threaddedly with end 13 to close cavity 14. End cap 18 includes inlet port 20 and inlet passage 21 which communicate with valve seat 22. Steel alloy diaphragm member 30 is located in cavity 14 between spacer member 35 and end cap 18. Steel alloy diaphragm 30 includes a plurality of through openings 33 (see FIGS. 1 and 2) and a solid central portion 34. Diaphragm 30 is made of a high strength, high fatigue steel such as Maraging steel. A generally hat shaped ring housing 40 is located within cavity 14 and spacer member 35. Top hat shaped ring housing 40 includes exterior radial flange 42 trapped between backing plate housing 11 and spacer member 35. Ring housing 40 includes central through opening 44 through which extends plug member 50. Plug member 50 includes through opening 52 which communicates with valve seat 58 disposed closely adjacent to one side of solid central portion 34 of diaphragm 30. Located closely adjacent the opposite side of solid central portion 34 is valve seat 22. A plurality of annular shaped piezoelectric discs or rings 60 are located within ring housing 40. Piezoelectric rings or discs 60 are connected with an electronic control mechanism such as a not shown electronic control unit or "ECU".

Pump 10 is intended to provide a boost pressure and hydraulic fluid flow in a hydraulic system. Under static conditions, pump 10 would allow the through flow of fluid in either direction, but when a suitable oscillatory electric power signal is provided by an electric controller ("ECU"), the outlet pressure would increase above inlet pressure. The operation of the pump depends on the resonant vibration of diaphragm 30 which, when set in motion by the sympathetic movement of the stack of piezoelectric discs 60, provides a boosted outlet pressure. In order to operate the pump at ultrasonic frequency, diaphragm disc 30 is clamped at its periphery between end cap 18 and spacer member 35. When an alternating voltage is applied by the controller to piezoelectric rings 60 at a resonant or ultrasonic frequency (typically around 20k Hz), small volume changes occur within fluid cavity 14 along with resultant pressure changes, and diaphragm 30 will resonate. A transient pressure increase in cavity 14 causes a force imbalance due no the different areas of valve seats 22 and 58, to cause diaphragm 30 to deflect toward valve seat 22 (the larger valve seat). As a resonant frequency is maintained, valve seat 22 will tend to be closed on high pressure pulses and open at the low pressure pulses, while valve seat 58 opens to high pressure pulses and closes to low pressure pulses. Inlet passage 21 and through opening or passage 52 serve as chokes and resist the passage of the high frequency pressure waves while allowing the mean static pressure (and some flow) to be transmitted. In this manner, outlet port 16 will maintain a greater fluid pressure than inlet port 20 as long as the electrical power is maintained.

Pump 10 can be utilized in the hydraulic channels or lines of a vehicle braking system to provide pressure boosting. Because hydraulic pump 10 is an ultrasonic pump, the pump's operation will be quiet and have an extremely fast response to transient signals. If the vehicle's system includes an anti-lock braking system, pump 10 can be utilized not only as a booster but as the modulator and makeup pump typically present in anti-lock braking systems. The pump can be utilized to modulate pressure to individual wheel brakes or to pairs of wheel brakes in response to wheel speed sensor signals in order to provide anti-lock braking.

Figure 4:
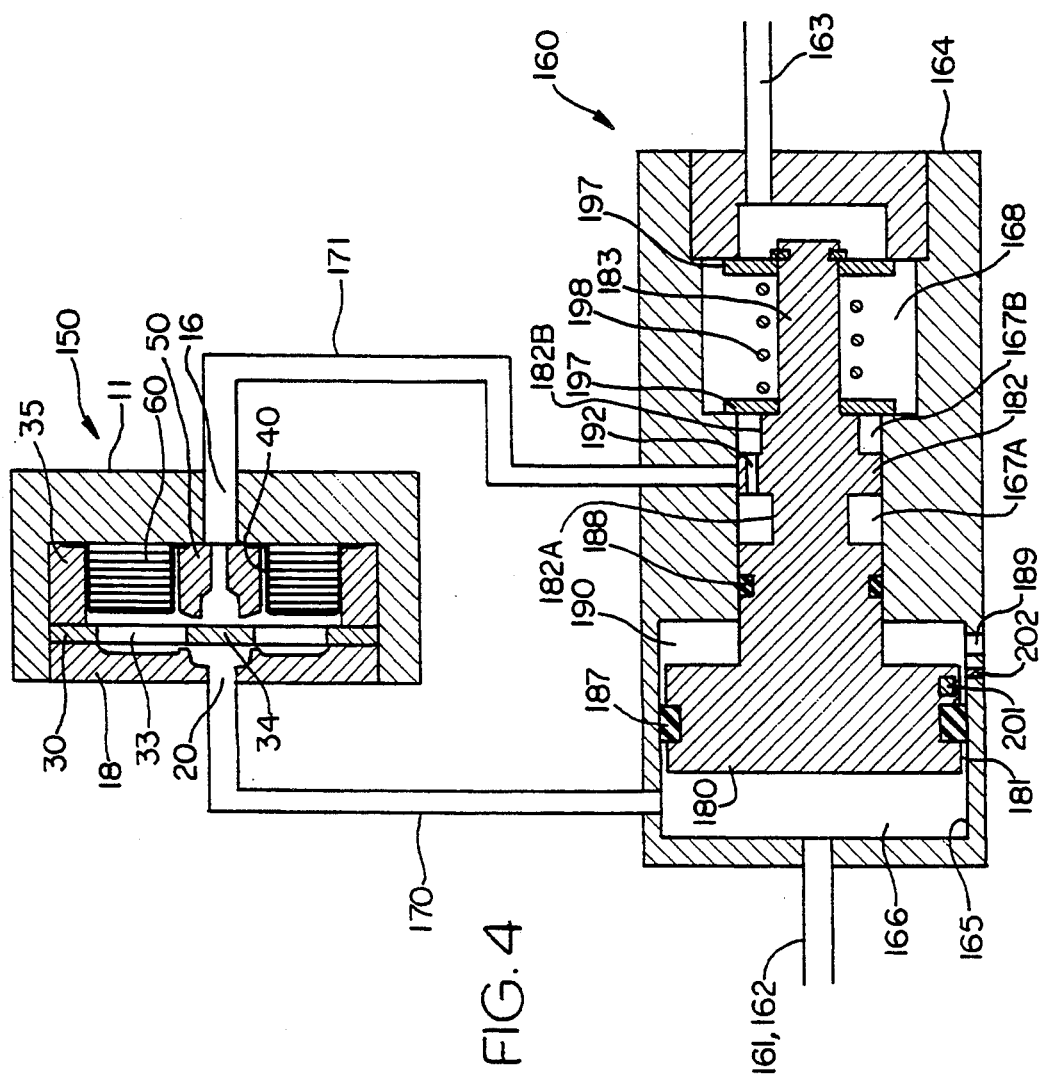
FIG. 4 is a section view of the ultrasonic pumps and booster valves illustrated in the braking system of FIG. 3.

FIG. 3 illustrates a pressure boosted hydraulic braking system designated generally by reference numeral 100. Braking system 100 includes a typical brake pedal 102 connected with master cylinder 104 that, when activated, communicates hydraulic braking pressure to the wheels of the vehicle. Braking system 100 is a cross split or "X" system wherein the master cylinder can communicate hydraulic braking pressure to the left front wheel brake 110 and right rear wheel brake 120 while another chamber of the master cylinder communicates hydraulic braking pressure to the right front wheel brake 130 and left rear wheel brake 140. The master cylinder is connected with wheel brakes 110 and 120 via an ultrasonic booster pump designated generally by reference numeral 150 which is connected with boost valve 160. Likewise, master cylinder 104 is connected with wheel brakes 130 and 140 via another ultrasonic pump 150 connected with another boost valve 160. An electronic controller or "ECU" 200 is connected with each of the ultrasonic booster pumps 150. Referring to FIG. 4, an enlarged section view of ultrasonic booster pumps 150 and boost valves 160 illustrates the structure therein. Each ultrasonic pump 150 comprises the same structure and functional operation as pump 10 illustrated in FIGS. 1 and 2 and will not be described again. Boost valves 160 include inlet line connection 161 or 162 from master cylinder 104 (see FIG. 3) and outlet connections 163 connected with the respective wheel brakes. Each valve 160 comprises valve housing 164 including stepped bore 165 having a first enlarged chamber 166, intermediate chamber 167 and outlet chamber 168. First enlarged chamber 166 communicates with fluid line 170 that is connected with the inlet port 20 of ultrasonic booster pump 150, and the outlet port 16 of the ultrasonic booster pump is connected with fluid line 171 that communicates with intermediate chambers 167A and B. Located within the bore 165 is multi-diameter spool 180 which includes enlarged diameter section 181 received within the first enlarged chamber 166, intermediate diameter section 182 received within and dividing intermediate chamber 167, and end section 183 received within outlet chamber 168. Enlarged diameter section 181 includes seal member 187 thereabout and intermediate diameter section 182 includes thereabout seal member 188. Spool 180, seals 187 and 188, and stepped bore 165 define atmospheric chamber 190 which communicates with housing atmospheric opening 189. Spool 180 and stepped bore 165 define first enlarged chamber 166 and end section 183 and stepped bore 165 define outlet chamber 168. Intermediate chambers 167A and B are defined between grooves 182A and B in spool 180 intermediate diameter section 182 and bore 166. Spool end section 183 includes thereabout a pair of washers 197 housing therebetween axial coil spring 198. Each of the washers 197 engages an abutment on spool 180 and also an abutment of the stepped bore, so that washers 197 and spring 198 which comprise a resilient means or mechanism effects a centered at-rest position of spool 180. Spool 180 also includes an axial through opening 192 so that fluid may be communicated between intermediate chambers 167A and B.

Valve mechanism 160 is provided so that braking pressure can be held at any pressure level without maintaining electrical power to the pump. This will minimize the power consumed by ultrasonic pump 150. Spool 180 includes enlarged diameter section 181 which is exposed to master cylinder pressure and the smaller area intermediate diameter section 182 which is exposed to brake pressure. The area ratio of those diameter sections defines the ratio of brake pressure to master cylinder pressure (boost pressure). The spool is held in the central at-rest position by spring 198 and washers 197 (that do not impede fluid flow) which engage respective abutments on the spool 180 and valve housing 164. When brake pedal 102 in FIG. 3 is depressed to generate hydraulic braking pressure within master cylinder 104, this pressure is transmitted to inlet line connections 161, 162 and the first enlarged chambers 166 of valves 160. Each spool 180 moves to the right in FIG. 4. Each spool 180 includes a magnet or other mechanism 201 which will actuate or close switch 202 connected with electronic control unit 200. Alternatively, brake pedal 102 can be associated with a brake pedal switch (not shown) so that when the brake pedal is depressed the brake pedal switch sends a signal to the ECU. In either event, the ECU receives an actuation signal and effects immediate energization of the respective ultrasonic pumps 150. The hydraulic fluid pressure transmitted from master cylinder 104 displaces some fluid to the respective brake or brakes as intermediate diameter section 182 moves with the spool to displace some fluid, and also uncovers fluid line 171. Pressurized fluid received from the associated energized ultrasonic pump 150 is fed through line 171, intermediate chamber 167A, axial opening 192, intermediate chamber 167B, outlet chamber 168, and outlet connection 163 to the associated brake or brakes. When the brake pressure reaches the desired value, the forces on spool 180 will balance and spool 180 will return to its illustrated central or at-rest position, switching off the pump and causing intermediate diameter section 182 to cover fluid line 171. Thus, hydraulic pressure will be maintained at the respective brake(s) until the driver effects a pressure change via the master cylinder. To decrease the pressure at the brake(s), decreased hydraulic fluid pressure received from the master cylinder and present at the first enlarged chamber 166 will permit the spool to be moved to the left as a result of the higher brake pressure located within outlet chamber 168. This causes fluid line 171 no be uncovered by intermediate diameter section 182 of spool 180 so that braking fluid pressure may return to master cylinder 104 via ultrasonic pump 150, first enlarged chamber 166, and the respective inlet line 161 or 162. Again, when a balance is reached, spool 180 will return to its at-rest position and pressure at the brake(s) will be maintained at that position.

The fluid pressure supply to the brakes in braking system 100 is initially from master cylinder 104 but when each pump 150 is operational most of the pressure is supplied to the brakes from the pumps while the master cylinder pressure remains relatively low. If a pump failure occurs, the respective spool 180 moves to the right and the driver must supply the braking pressure directly, which requires more pedal effort, but without any increase in travel compared with a boosted system. In a split brake system the increased pedal force would increase the pressure on the remaining boosted brakes and to a lesser extent on the failed boosted brakes, until the demanded deceleration is achieved. There would be no additional medal movement under this partial failure condition, and only a small increase in driver effort.

The ultrasonic pump and braking system of the present invention provides significant advantages over prior braking systems. The piezoelectric discs 60 cause a resonance or vibration of diaphragm 30 but no other parts within the pump experience any type of movement. The ultrasonic pump or booster can be either remote or integral with the master cylinder, and where multiple ultrasonic pumps or boosters are utilized, any single failure results in boost being available for half the system. In a vertically split system, the ultrasonic pump associated with the rear wheels can effect, through different power levels to the respective ultrasonic pumps, a proportioning of hydraulic fluid pressure communicated to the rear wheel brakes relative to hydraulic pressure being communicated to the front wheel brakes. Also, the ultrasonic pump can in an anti-lock braking system be controlled by the electronic control unit and would effectively replace the booster, modulator and make-up pump in such a system.

I claim:

1. An ultrasonic pump, comprising a backing plate housing defining therein a cavity communicating with an end opening, an end cap located at the end opening, the end cap having a first port and the backing plate housing having a second port, a ring housing located within the cavity, a diaphragm located within the cavity between the end cap and backing plate housing, the diaphragm having therein a plurality of openings, a plurality of piezoelectric rings disposed in the ring housing and located in the cavity between the diaphragm and backing plate housing, and second port plug member means located within the rings and ring housing and between the backing plate housing and diaphragm, the plug member means having a through opening communicating with the second port, such that excitation of said piezoelectric rings effects resonance of said diaphragm to cause hydraulic fluid located within the cavity to be transmitted between the ports.

2. The ultrasonic pump in accordance with claim 1, wherein the end cap includes a valve seat disposed closely adjacent one side of a solid central portion of said diaphragm and a valve seat of the plug member means is disposed closely adjacent the other side of the solid central portion.

3. The ultrasonic pump in accordance with claim 2, wherein the ring housing comprises a generally top hat shaped housing located within a spacer member and having a central through opening through which extends said plug member means, and a radially outer flange located between an end of said spacer member and said housing plate.

4. The ultrasonic pump in accordance with claim 1, wherein the diaphragm includes at least three openings therethrough.

5. The ultrasonic pump in accordance with claim 1, wherein the end cap includes an annular recess located in alignment with said openings in the diaphragm.

6. The ultrasonic pump in accordance with claim 1, wherein the first port is an inlet port and the second port is an outlet port.

7. The ultrasonic pump of claim 1 in combination with a vehicle braking system, the vehicle braking system comprising master cylinder means connected with a boost valve, the boost valve connected with at least one wheel brake the ultrasonic pump connected with the boost valve, electronic control means connected with said ultrasonic pump and the boost valve, so that operation of the master cylinder means transmits hydraulic fluid pressure to effect operation of the boost valve which is sensed by the electronic control means that effects operation of the ultrasonic pump to provide a boost pressure transmitted via the boost valve to the wheel brake.

8. The combination in accordance with claim 7, wherein the boost valve comprises a valve housing having therein a stepped bore, an inlet connected with the master cylinder means, an outlet connected with the wheel brake, a first enlarged chamber adjacent an intermediate chamber which is adjacent an outlet chamber, a multi-diameter spool located within the bore and having an enlarged diameter section located within the first enlarged chamber, an intermediate diameter section located between a pair of reduced diameter sections, and an end section having resilient means disposed thereabout which engages the valve housing to effect an at-rest position of the spool, the intermediate diameter section having therein at least one through axial opening, the first enlarged chamber communicating with the first port of the ultrasonic pump, and the second port of the ultrasonic pump communicating with the intermediate chamber of the valve housing.

9. The combination in accordance with claim 8, wherein the intermediate diameter section of the spool closes the communication with the second port when the spool is in the at-rest position.

10. The combination in accordance with claim 9, wherein the spool includes a pair of sealing means located thereabout, the sealing means, spool and bore defining an atmospheric chamber which communicates with an atmospheric opening in the housing.

11. The combination in accordance with claim 8, wherein the resilient means comprises a pair of washers having a spring located therebetween to bias the washers axially away from one another, each washer engaging a respective portion of the spool and a respective abutment at the bore.

12. The combination in accordance with claim 7, wherein the vehicle braking system comprises the ultrasonic pump and boost valve connected with two wheel brakes and a second ultrasonic pump and boost valve connected with two other wheel brakes.

13. The combination in accordance with claim 12, wherein each of the sets of the two wheel brakes and two other wheel brakes comprises a front wheel brake and a rear wheel brake.

14. The combination in accordance with claim 12, wherein one set of the ultrasonic pumps and boost valves is connected with rear wheel brakes and effects a proportioning of hydraulic fluid pressure transmitted to the rear wheel brakes relative to hydraulic fluid pressure communicated to front wheel brakes.

15. An ultrasonic pump, comprising a housing with first and second housing ends and defining therein a cavity, the first housing end having a first port and the second housing end having a second port, ring housing means and a diaphragm located within the cavity, the diaphragm having therein a plurality of openings, a plurality of piezoelectric rings located within the ring housing means and in the cavity between the diaphragm and second housing end, and second end port member means extending into the rings and ring housing means and between the second housing end and diaphragm, the second end port member means having a through opening communicating with the second port, such that excitation of said piezoelectric rings effects resonance of said diaphragm to cause fluid located within the cavity to be transmitted between the ports.

16. The ultrasonic pump in accordance with claim 15, wherein the first housing end includes a valve seat disposed closely adjacent to one side of a solid central portion of said diaphragm and a valve seat of the second end port member means is disposed closely adjacent to the other side of the solid central portion.

17. The ultrasonic pump in accordance with claim 16, wherein the ring housing means comprises a generally top hat shaped housing located within a spacer member and having a central through opening through which extends said second end port member means, and a radially outer flange located between an end of said spacer and said second housing end.

18. The ultrasonic pump in accordance with claim 15, wherein the diaphragm includes at least three openings therethrough.

19. The ultrasonic pump in accordance with claim 15, wherein the first housing end includes an annular recess located in alignment with said openings in the diaphragm.

20. The ultrasonic pump in accordance with claim 15, wherein the first port is an inlet port and the second port is an outlet port.

21. The ultrasonic pump of claim 15 in combination with a vehicle braking system, the vehicle braking system comprising master cylinder means connected with a boost valve, the boost valve connected with at least one wheel brake, the ultrasonic pump connected with the boost valve, electronic control means connected with said ultrasonic pump and responsive to the boost valve, so that operation of the master cylinder means transmits an hydraulic fluid pressure to effect operation of the boost valve which is sensed by the electronic control means that effects operation of the ultrasonic pump to provide a boost pressure transmitted via the boost valve to the wheel brake.

22. The combination in accordance with claim 21, wherein the vehicle braking system comprises the ultrasonic pump and boost valve connected with two wheel brakes and a second ultrasonic pump and boost valve connected with two other wheel brakes.

23. The combination in accordance with claim 22, wherein each of the sets of the two wheel brakes and two other wheel brakes comprises a front wheel brake and a rear wheel brake.

24. The combination in accordance with claim 22, wherein one set of the ultrasonic pumps and boost valves is connected with rear wheel brakes and effects a proportioning of hydraulic fluid pressure transmitted to the rear wheel brakes relative to hydraulic fluid pressure communicated to the front wheel brakes.

* * * * *